F. C. MERRY.
SPECTACLE OR EYEGLASS MOUNTING.
APPLICATION FILED SEPT. 3, 1915.
1,189,986.
Patented July 4, 1916.
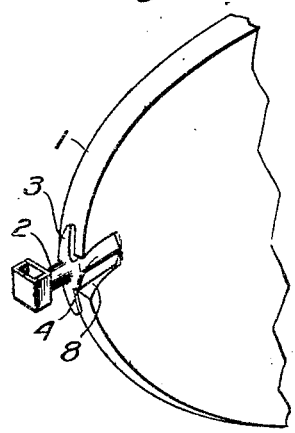
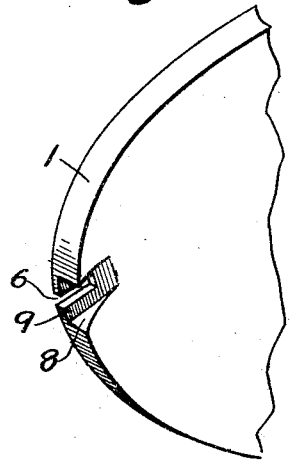
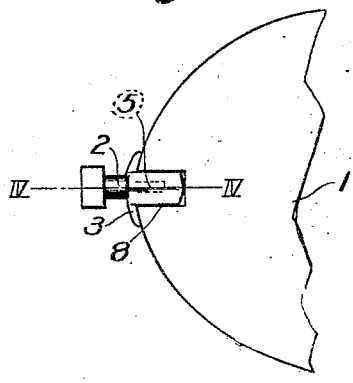
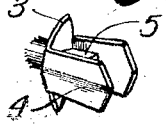
Inventor
Fred. C. Merry.
By Arthur C. Brown.
Attorney

UNITED STATES PATENT OFFICE.

FREDERICK C. MERRY, OF KANSAS CITY, MISSOURI.

SPECTACLE OR EYEGLASS MOUNTING.

1,189,986.  Specification of Letters Patent.  Patented July 4, 1916.

Application filed September 2, 1915. Serial No. 48,922.

*To all whom it may concern:*

Be it known that I, FREDERICK C. MERRY, a citizen of the United States, residing at Kansas City, in the county of Jackson and State of Missouri, have invented certain new and useful Improvements in Spectacle or Eyeglass Mountings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to spectacle or eyeglass mountings and has for its principal object to provide means whereby lenses of different curvature or extraordinary thickness may be connected with their mountings otherwise than by the use of screws or the like. In accomplishing this object I have provided improved details of structure, the preferred forms of which are illustrated in the accompanying drawings, wherein:

Figure I is a perspective view of part of a spectacle or eyeglass mounting, showing its attachment to a lens of concave curvature. Fig. II is a similar view of a part of the lens, with the mounting removed to better illustrate the attaching portion of the lens. Fig. III is an elevation of the parts shown in Fig. I. Fig. IV is a longitudinal section on the line IV—IV, Fig. III. Fig. V is a similar view of the lens, with the mounting removed. Fig. VI is a detail perspective view of the bifurcated lens post forming part of the invention.

Referring more in detail to the drawings: 1 designates a portion of an eyeglass lens, here shown to be of concave curvature, that is, having a thick edge and relatively thin interior proportions, and 2 designates a bifurcated mounting post, having straps 3 that lie along the edge of the lens, ears 4 that are adapted for application to opposite faces of the lens, and a tongue 5 which connects the ears at their base ends and is adapted for projection into a slot that opens through the edge of the lens. With a mounting of this construction, where the lens slot is of the same thickness throughout, the ears 4 could lie on opposite faces of the lens with the tongue projected into the slot and a secure fastening be effected without manipulation of the ears or any difficult fitting of the ears to the faces of the lens. With a concave or curved lens, however, in order to secure a close fit of the mounting ears along the faces of the lens, which is necessary in order to make the mounting rigid and secure, it would be necessary to bend the ears in order that they might follow the curvature of the lens. This would not only be difficult, but it would weaken the mounting and afford an unsatisfactory connection between the mounting and the lens. In order, therefore, to obviate this disadvantage, I provide a groove 8 in the curved face of the lens, along the slot 6, to secure a uniformly thick base 9, the thickness of the base being such that the bifurcated portion of the post may project thereover to seat one of the members in the groove, so that the mounting may be effected without bending or spreading the bifurcations to any material extent.

In using the invention the mountings are made up of a stock size, wherein the ears are spaced to snugly receive a lens of average thickness, the material of which the mounting is composed being sufficiently pliable to permit the ears to be bent inwardly or outwardly to receive a lens of slightly greater or less than the average thickness, in order that the ears may be shaped to fit the lens and the lens gripped tightly by the mounting to provide a rigid connection therebetween.

When the mounting is to be applied to a concave or convex lens, that is, one having a curved face of extraordinary thickness at its rim, the lens is grooved in its curved face and along the slot 6 to reduce the thickness of the edge sufficiently to receive the bifurcated members of the mounting, so that they may fit over the edge of the lens without material bending and thereby obviate the necessity of shaping the mounting ears to the curved face of the lens, and without bending the ears to form the extraordinary width therebetween. Not only does this grooving of the lens reduce its thickness to enable it to receive the bifurcated mounting member, but it forms a socket for receiving the bifurcated member, so that the ear that is located within such socket may brace against the sides of the groove, and increase the rigidity with which the lens is held by the mounting. In using a mounting of this description, with a lens having a groove and provided with transverse slot, cement is applied to the slotted part of the lens, or to the mounting, so that when the mounting is applied to the lens and the tongue projected into the lens slot, the cement will embed the mounting tongue to form a bond between the lens and mounting which will firmly connect the parts and hold the lens rigid on the mounting, without the aid of screws or the like that would require drilling of the lens, the cement also passing into the groove, at the sides of its slot, to attach the ears to the base and edges of the grooved portion.

Having thus described my invention, what I claim as new therein, and desire to secure by Letters-Patent, is:—

1. The combination with a lens having a groove opening through its head, of a mounting comprising pair of ears, one seated in said groove and the other lying along the opposite face of the lens, the base of the groove being inclined to spread the ears substantially as set forth.

2. The combination with a lens comprising a rim of greater thickness than the body of the lens, and having a groove opening through its edge, of a mounting comprising paired ears, one seated in said groove and the other lying along the opposite face of the lens, the base of the groove being inclined to spread the ears, substantially as set forth.

In testimony whereof I affix my signature.

FREDERICK C. MERRY.